April 14, 1931.  A. MOORE  1,800,467
MECHANICAL MOVEMENT
Filed March 24, 1927
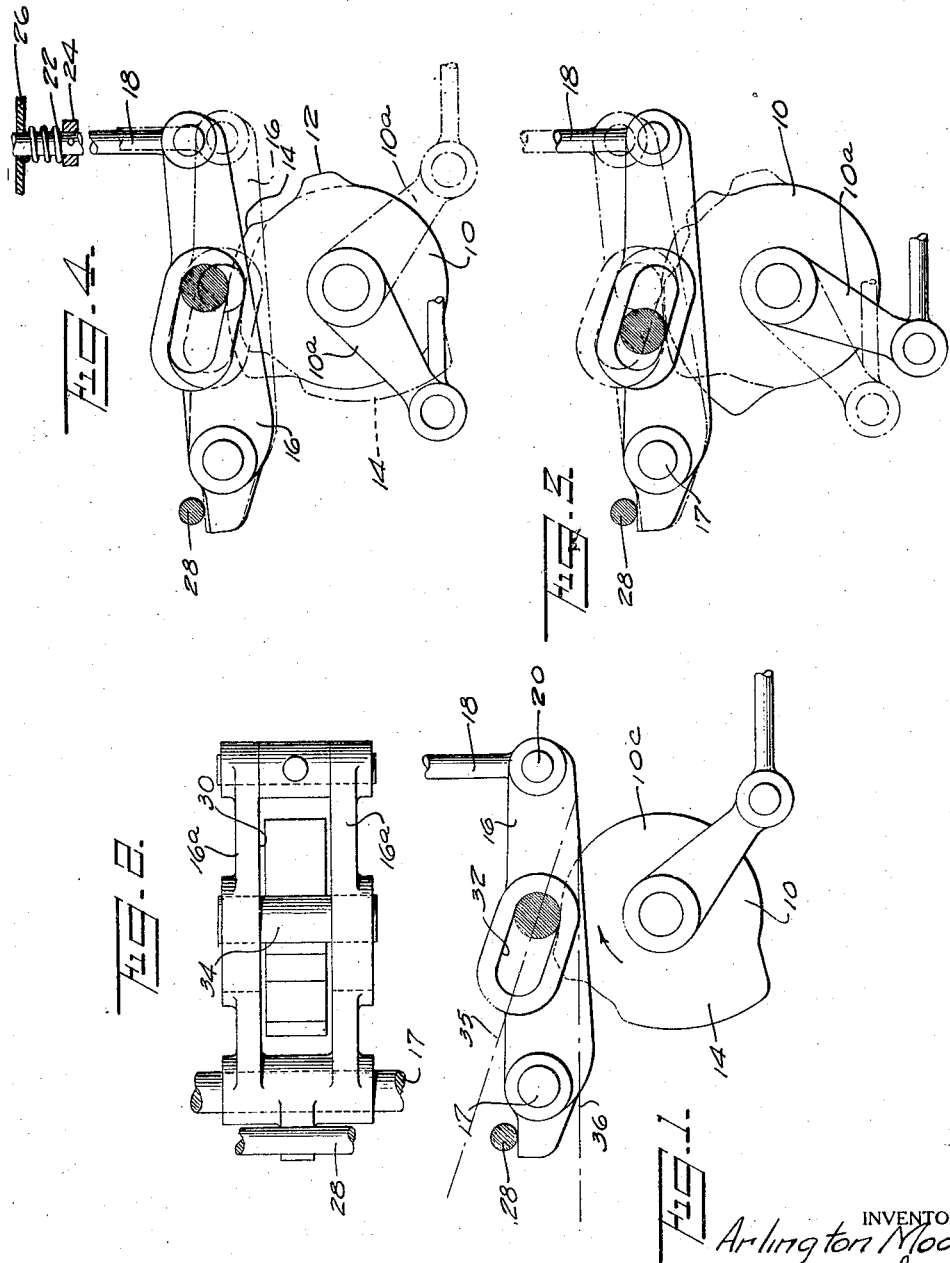
INVENTOR
Arlington Moore
BY
Dyke & Schainer
ATTORNEY Patented Apr. 14, 1931

1,800,467

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

MECHANICAL MOVEMENT

Application filed March 24, 1927. Serial No. 177,866.

My invention relates to a mechanical movement.

An object of the invention is the provision of a mechanical movement whereby rotation of a member in one direction serves to actuate another member, but said last-named member is not actuated by the first-named member upon rotation or movement of said first-named member in the opposite direction.

Another object of the invention consists in the provision of a mechanical movement wherein rotation of a cam member in one direction serves to actuate a second member against spring return means, which said second member is released and permitted to be returned by its spring upon any movement of the first-named member in the opposite direction, however slight such movement may be.

With the foregoing and related objects in view, my invention will be best understood from the following description of an embodiment thereof shown in accompanying drawings.

In said drawings, Fig. 1 is a side view, Fig. 2 is a plan view, and Figs. 3 and 4 are views similar to Fig. 1 and illustrating various positions of the mechanical elements.

Reference character 10 designates a cam, which as shown is circular, except for the two camming projections 12 and 14, of which 12 is shown as a relatively short and 14 as a more elongated camming surface. The cam 10 can be turned through a sufficient part of a revolution to bring the camming surfaces 12 and 14 into operative position, as by means of a crank 10a and a link 10b.

The actuated member is here shown as having the form of a lever 16, pivoted to turn on a shaft or axis 17. The lever 16 may be used to actuate any mechanical part or device, as for example it may actuate a plunger 18, pivoted to the lever 16 at 20. The plunger 18 may be spring-returned, and in the form shown the plunger 18 works against a compression spring 22, which is interposed between a shoulder or collar 24 on the plunger 18, and a stationary abutment indicated at 26. A stop 28 is provided for limiting the return movement of lever 16 in a direction toward the axis of the cam 10.

The lever 16 has an opening as 30 therein, over or opposite the cam 10, and said lever 16 may be conveniently formed of the two parallel and spaced-apart portions 16a, 16a, with opening 30 therebetween. A pair of inclined slots 32, 32 are formed in the lever portions 16a, 16a, and a roller 34 has a running fit in the slots 32, 32. The relation of the slots 32 and member 16 to the cam 10 is such that when the lever 16 is supported by stop 28 and the roller 34 is at that end of the slots 32 nearest to cam 10, said roller 34 makes contact with or approaches very closely to the circular portion 10c of cam 10, and upon rotation of the cam 10, will be engaged by camming projections thereon as 12 and 14.

Whether or not the lever 16 will be actuated by engagement of camming portions 12 and 14 with the roller 34 is dependent upon the direction of rotation of said cam 10. If the cam 10 is turned in the direction indicated by the arrow in Fig. 1 and the inclination of slots 32 is within a suitably small range, that is to say if the longitudinal axis 35 of slots 32 makes a suitable angle with a horizontal line, as 36 located approximately tangentially relative to the circular surface 10c of cam 10 at the region of contact between roller 34 and cam 10, then upon further rotation of the cam 10 the lever 16 will be turned on its pivot and the plunger 18 raised against spring 22. I found that when the angle referred to is an angle of substantially 18°, the upward camming of lever 16 through the roller 34 will be effected with certainty. This angle may be somewhat greater or less than 18°, but in any case should be under 30° to secure certainty of operation where mechanical elements are constructed of smooth polished steel or similar material.

Any return movement of cam 10 or rotation thereof in the opposite direction from that indicated by the arrow in Fig. 1, will start the roller 34 moving toward the upper end of slot 32, and as soon as any such return movement of cam 10 takes place, the roller 34 will immediately ride away from the cam 10 toward the upper portion of the slot 32, thus releasing lever 16 from actuation by the camming surfaces 12 and 14 of cam 10, whereupon it is returned by spring 22 until stopped at 28. The operation is indicated with special reference to cam surface 14 in Figs. 3 and 4. When cam 10 is turned by the crank 10a from the dotted line to the full line position of Fig. 4, the thrust exerted by the cam on the roller 34 carries the said roller 34 toward the lower end of slot 32, so that upon roller 34 being encountered by the cam surface 14, the roller 34 and the lever 16 are raised, and move from the initial position shown in dotted lines on said figure to the final position shown in full lines thereon. Thus the plunger 18 is lifted and spring 22 compressed. Upon return movement of the cam 10, as movement from the dotted line position of Fig. 3 to the full line position thereof, a reverse thrust is imparted to roller 34 and with even a very slight reverse movement of cam 10 the roller 34 will be released and will ride up toward the high end of slot 32 and rest slightly upon the camming surface 14 without imparting any lifting effect to lever 16, whereupon the plunger 18 will return to its original lowermost position under the actuation of spring 22.

While in a construction such as shown the extent of rotation of cam 10 is limited, it will be seen that if the cam 10 is freed so that it can be rotated without limit in either direction, as may be desirable with certain forms of mechanism, the situation is the same for full as for partial rotation; that is to say, upon rotating the cam 10 in the direction shown by the arrow in Fig. 1, the lever 16 will be depressed as long as no cam projections are encountered by roller 34, and will be raised as and when such projections are encountered and engage the roller 34. When unlimited rotation is imparted to cam 10 in the opposite direction, however, there is no resulting actuation of lever 16, the roller 34 simply riding up in the slots 32 on the cam projections as same are encountered, with no lifting of lever 16.

The mechanical movement of my invention has a wide application and may be made use of in various mechanisms. Merely by way of giving one example in which it is of utility, I have found that it has a high utility for the purpose of operating a supplemental fuel supply for internal combustion engines. Such supplemental fuel supply requires the release of the fuel to the engine during accelerating movement of the throttle, whereas upon decelerating movement of the throttle in the opposite direction, there is no requirement for supply of supplemental fuel. It is desirable in such mechanisms to operate the fuel supply release upon opening movement of the throttle and connected machine elements, and to return the throttle without operating the fuel supply release. With the supplemental fuel delivery of such an apparatus operated by a mechanical movement such as I have described, this result of turning on the extra fuel when the throttle is operated in one direction, and dispensing therewith upon movement of the throttle in the opposite direction can be advantageously and readily effected. As stated, however, this is by way of example only, and to afford a better understanding of the invention, which is in no way limited to such specific application.

The scope of my invention is as defined by the following claims.

I claim:

1. In a mechanical movement, an actuating member movable in opposite directions, a cam portion thereon, a member to be actuated thereby, and means interposed between said members and adapted to be engaged and disengaged by said cam portion at an interval during movement of said actuating member in one direction to actuate said second member and allow the return thereof, said interposed means being unidirectionally effective and becoming inoperative to actuate said second member when engaged by said cam portion upon return movement of said actuating member.

2. In a mechanical movement, an actuating member movable in opposite directions, a member to be actuated thereby, and unidirectionally acting means yieldably carried by said last named member; said actuating member being movable in one direction over said means in operative relation thereto for actuating said last named member, and in the opposite direction relative to said means in inoperative relation thereto, whereby to effect the actuation of said last named member upon movement of said actuating member in one direction only.

3. In a mechanical movement, a member to be actuated, unidirectionally acting means carried by said member, a member movable in opposite directions, and actuating means thereon movable over said unidirectionally acting means in operative relation thereto at an interval during movement of said second named member in one direction for effecting the actuation of said first named member, and movable relative to said unidirectionally acting means in inoperative relation thereto upon return movement of said second named member for preventing the actuation of said first named member.

4. In a mechanical movement, a member to be actuated having a slotted portion, a yieldable member in said slotted portion adapted to rest at the lower end thereof, and a cam adapted to engage said yieldable member upon movement of the cam in one direction for effecting the actuation of said first named member, and adapted to release said yieldable member upon movement of the cam in the opposite direction for preventing the actuation of said first named member.

5. In a mechanical movement, a member to be actuated having a slotted portion, a roller in said slotted portion adapted to rest at the lower end thereof, and a rotatable member having a cam nib adapted to engage said roller at an interval during movement of the rotatable member in one direction for effecting the actuation of said first named member, and adapted to release said roller upon movement of said rotatable member in the opposite direction for preventing the actuation of said first named member.

6. In a mechanical movement, a member pivoted at one end and having spaced arms provided with slots, a roller disposed in said slots and tending to rest at the lower ends thereof, a rotatable member disposed between said arms and having a nib adapted to be moved in one direction over said roller in operative relation thereto for effecting the actuation of said pivoted member, and in the opposite direction relative to said roller in inoperative relation thereto for preventing the actuation of said pivoted member, and spring means for retaining said pivoted member and said rotatable member in operative relation.

7. In a mechanical movement, a rotary actuating cam, a member to be actuated thereby, and means comprising a roller running in an inclined slot for imparting actuation from said cam to said member upon rotation of the cam in one direction, said roller riding up in the inclined slot when encountered by the cam being rotated in the opposite direction.

8. In a mechanical movement, a rotary cam, a lever to be actuated, spring means pressing said lever toward the cam, and a roller in the path of the cam and having a running fit in an inclined runway formed in the lever, whereby upon turning the cam in one direction the lever is moved against the spring through the intermediation of the roller being located in the lowermost portion of the runway, and whereby upon movement of the cam in the opposite direction the roller rides up in the runway without actuating the lever.

9. In a mechanical movement, a cam, a lever pivoted adjacent thereto and formed in two parts, one extending to each side of the cam, identical inclined slots formed in the parts of the lever, and a roller adapted to be engaged by said cam and having a running fit in said inclined slots.

10. In a mechanical movement, a part to be actuated, and a floating member carried by said part for movement thereon and normally positioned at one end of its path of travel, and a rotary cam adapted to exert a wedging action on said floating member to cause actuation of said part in one direction of movement of the cam and to dislodge the floating member from its normal position to cause movement thereof relative to said part and prevent actuation of said part in the other direction of movement of the cam.

In testimony whereof, I have signed my name hereto.

ARLINGTON MOORE.